United States Patent [19]

Rauchwerger

[11] Patent Number: 4,566,507
[45] Date of Patent: Jan. 28, 1986

[54] LIQUID BEVERAGE DISPENSER

[76] Inventor: George P. Rauchwerger, 147 Cromart Ct., Sunnyvale, Calif. 94087

[21] Appl. No.: 578,494

[22] Filed: Feb. 9, 1984

[51] Int. Cl.⁴ .............................................. B65B 3/04
[52] U.S. Cl. ..................................... 141/271; 141/377
[58] Field of Search .................................. 141/85–88, 141/98, 360, 361, 362, 250–284

[56] References Cited

U.S. PATENT DOCUMENTS

| | | | |
|---|---|---|---|
| 317,482 | 5/1885 | Albach et al. | 141/271 |
| 2,472,921 | 6/1949 | Quimper | 141/88 |
| 4,130,145 | 12/1978 | Thomas | 141/88 |

Primary Examiner—Houston S. Bell, Jr.
Attorney, Agent, or Firm—Julian Caplan

[57] ABSTRACT

Dispenser for liquids requiring use of one hand, particularly useful for motorists, has a collapsible plastic bag with a delivery spout enclosed in an insulated casing adapted for mounting on the ledge above the dashboard of a vehicle. Swivelled to the device is a cup holder which positions the cup under the spout for dispensing liquid and away from the spout for convenient removal and replacement of the cup. Only one hand is required to activate the spout, swivel the holder, and grasp the cup. The bag may be refilled as required either through the spout with the bag in the casing or by opening the casing and removing the bag.

4 Claims, 5 Drawing Figures

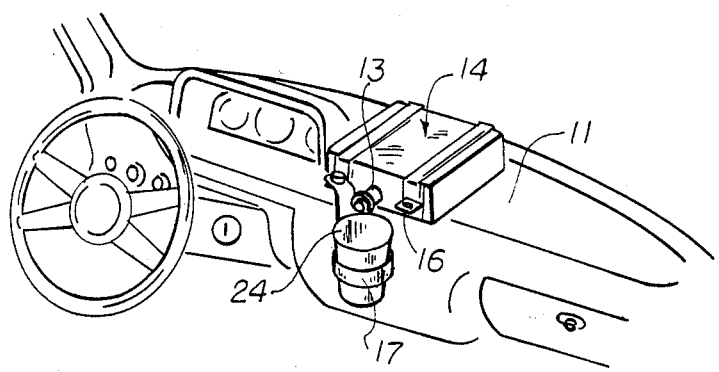
Fig.1
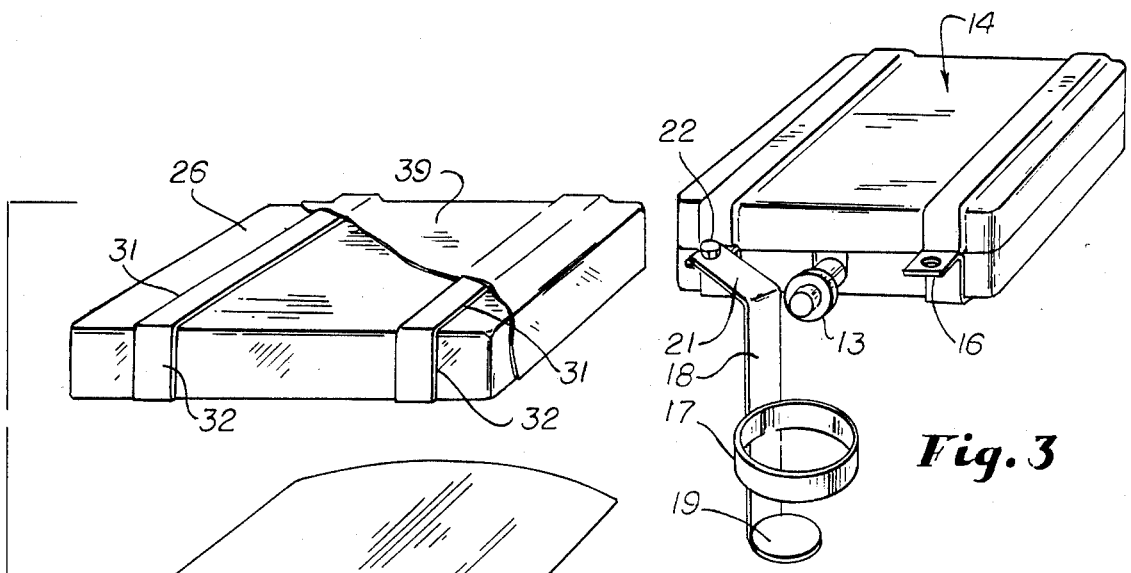
Fig.3
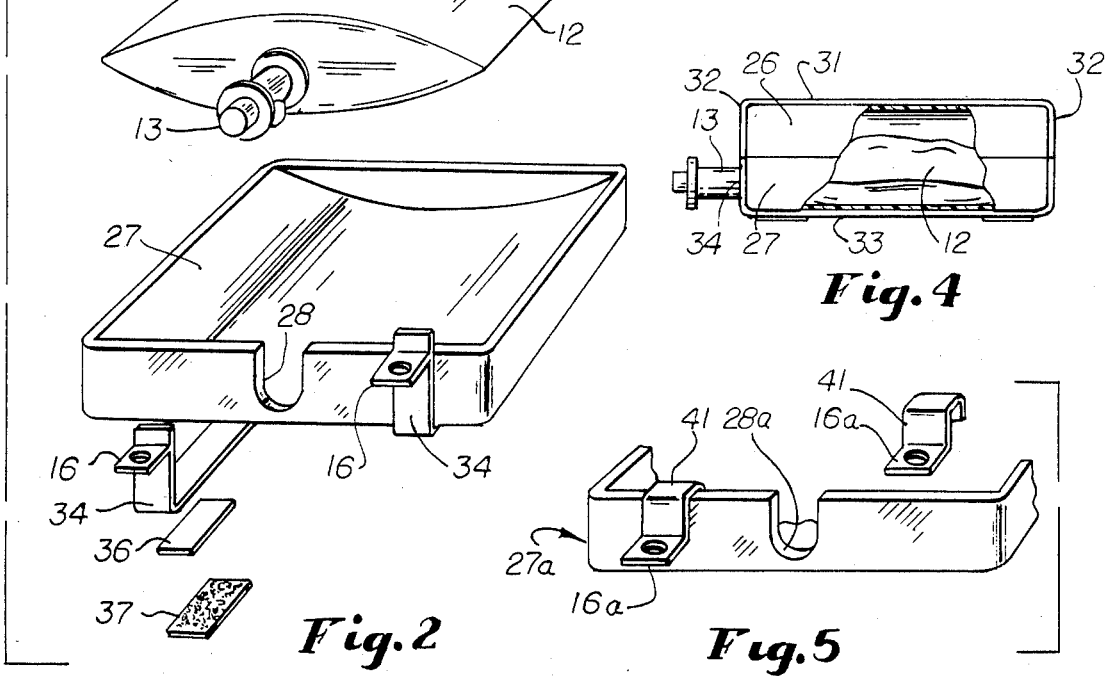
Fig.2
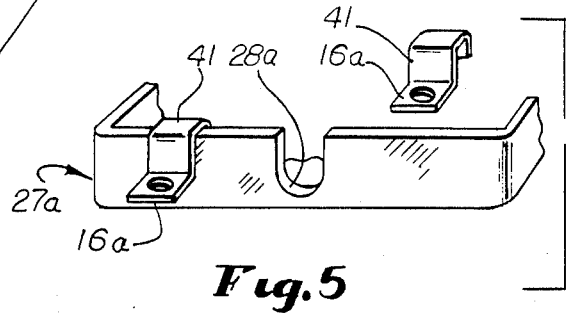
Fig.4
Fig.5

LIQUID BEVERAGE DISPENSER

This invention relates to a new and improved liquid beverage dispenser. More particularly, the invention relates to a dispenser preferably mounted near the driver of a vehicle such as an automobile, truck, camper, boat or the like, distinguished by the fact that it requires the use of only one hand. Thus, particularly when the driver is unaccompanied by a passenger, it is unnecessary to stop the vehicle in order to pour hot or cold liquids from a container such as a vacuum bottle or ordinary bottle.

Another feature of the invention is the fact that available components are used and assembled in the device. Thus the device uses a collapsible plastic bag to contain the liquid. Such a bag is used in packaging wine and contained within a corrugated paperboard box. The wine bag has a valve which may be used in the present invention. Thus no special valve or vents for the container are required. Additionally, air does not enter the bag and hence deterioration of taste of the liquid is reduced.

Another conventional device used is a holder for the cup. This holder is of the type conventionally attached to the sill of an automobile window. In the present invention the holder is attached by a swivel arrangemenent.

Another feature of the invention is the fact that the device is temporarily attached to the ledge above the dashboard of a vehicle. Hence it can readily be removed for filling or cleaning. When in place the container does not block the vision of the driver. It is attractive in appearance. It may be covered with an antiglare surface.

Conventional automobile ledges slant toward the interior of the vehicle. Hence the device when installed drains automatically. The interior of the container for the bag is sloped toward the center, further to facilitate proper drainage of the entire contents of the bag.

The container may be of a heat insulating material such as plastic foam. This maintains the liquids hot or cold for reasonable periods of time.

In the drawings:

FIG. 1 is a schematic perspective view showing the device of the present invention installed in an automobile.

FIG. 2 is an exploded perspective view of the device partly broken away to reveal internal construction.

FIG. 3 is an enlarged perspective view of the device.

FIG. 4 is a side elevational view of the structure of FIG. 3 partly broken away to reveal internal construction.

FIG. 5 is a fragmentary view of a portion of a modification.

The device of the present invention may be used in a number of environments. A preferred use is installed on the ledge 11 above the dashboard of an automobile. Such ledge 11 frequently slopes downwardly-rearwardly and this facilitates drainage of liquid in the device.

Within the device is a bag 12 similar or identical to those used in the interior of containers for wine of the type packaged inside a corrugated paperboard container. Such bags have a spout 13 of a type which may be actuated by gripping the ring with the fingers and pushing in the exposed valve actuator with the thumb, all with one hand. The liquid flows through an opening (not shown) on the bottom. The bag 12 is shown in its filled condition FIG. 2 having rounded top, bottom and ends. The spout 13 is preferably at the lowest point of the bag when it is in installed condition so that so long as there is any liquid remaining it will flow out through the spout 13. Bag 12 is conventionally of a flexible plastic material which may be metallized on its exterior to reduce heat loss.

The bag 12 is installed within an insulated container 14 preferably of a foam plastic construction (e.g., Styrofoam) either removably or permanently. One preferred form of container 14 is hereinafter described in detail.

Fixed to the container 14 or its support is a lug 16 extending out horizontally in about the plane of the spout 13. In a preferred embodiment there may be two lugs 16, one on each side. The apertured lugs 16 support a cup holder consisting of a ring 17 fixed to a vertical riser 18 which has a foot 19 at the bottom to prevent the cup from falling through the ring 17. At the upper end of riser 18 is a horizontal stretch 21 which is also apertured. Pivot pin 22 passes through the aligned apertures in the horizontal stretch 21 and lug 16. A tapered cup 24 of disposable material (e.g., Styrofoam) or a permanent cup of ceramics fits in and is supported by the ring 17. The cup 24 is inserted in the ring 17 and the cup holder is pivoted so that the cup is under the spout 13. Liquid is then dispensed from the bag 12 through actuation of the spout 13 and drains into the cup. The horizontal stretch 21 may then be pivoted from the position of FIG. 1 to a position where the cup is located closer to the driver of the vehicle and is out from under the spout 13.

Directing attention now to details of the container 14, it may consist of a top 26 which is streamlined on its exterior and is recessed on the underside complementary to the top of the bag 12 when the latter is full. Bottom 27 preferably has a flat underside and its upperface is recessed complementary to the bottom of a full bag 12. A notch 28 is formed in the front of bottom 27 to accommodate the spout 13. Various means may be used to fasten the top 26 and 27 together. If the bag 12 is to be permanently installed therein, the two halves may be secured by glue or other permanent means. As shown in FIGS. 2-4, top straps 31 fit across the top of the upper portion 26 and, front and rear, have downwardly extending ends 32. Bottom fastening straps 33 fit under the bottom of the lower half 27 and have upward extending ends 34 which interfit with ends 32 to secure the halves 26 and 27 together.

One means to mount the device on the ledge 11 is illustrated in FIG. 2. Thus mating pieces of Velcro-like fastening material may be used. Pieces 37 are glued or otherwise affixed to the ledge 11. The matching pieces 36 are affixed to the underside of the container 14, preferably to the underside of the straps 33.

In the form of the invention shown in FIGS. 2-4, when it is necessary to refill the bag 12, either the fastener materials 36 may be disconnected from the fastener materials 37 and the entire container 14 removed or, alternatively, the top 26 may be removed from the bottom 27 by disconnecting the ends 32 from the ends 34.

As shown in FIG. 5, the straps 31, 33 are eliminated. Brackets 41 which are of an inverted U-shape, fit over the forward edge of bottom 27a. In this modification the fastener element 36 is fixed to the bottom of half 27a by various means such as the use of adhesive.

In use, the bag 12 is filled through the spout 13. The spout is removable for cleaning and the bag may be filled with the spout removed. The bag 12 is then installed in the recess in the bottom 27 and the top 26 applied, the ends 32 interfitting with the end 34. As has previously been stated, in some instances the bag 12 is permanently installed inside the container 14. The cup holder is then attached by inserting the pivot 22 through the stretch 21 and one of the lugs 16, whichever is preferred.

When the user wishes to dispense part of the contents of the bag 12, he swings the cup holder so that the cup 24 is under the spout 13 and pushes the actuator inward. As liquid is dispensed, atmospheric pressure forces the bag 12 into a more compact form, depending upon the quantity of liquid dispensed. Thus air does not enter the bag and the contents are not deteriorated. By reason of the sloping cavities in the top 26 and bottom 27 and the fact that the ledge 11 tilts and that the spout 13 is at the lowest point in the bag 12, the entire contents may be dispensed.

When the bag 12 is empty, either the entire container 14 may be removed from the ledge 11 and brought to a point where new liquid can be inserted through the spout 13 or the top 26 may be opened, permitting the bag 12 to be removed for refilling.

What is claimed is:

1. In combination, a vehicle dashboard ledge, a top thermal insulating container portion having a bottom surface, a bottom thermal insulating portion having a top surface shaped to fit tightly against said top surface, said portions being internally recessed to form a chamber, a flexible bag within said chamber having a dispenser spout at one end, at least one said portion being formed with a notch through which said spout extends, at least one strap around said portions to detachably secure said portions together, a lug on said strap in proximity to said spout, a cup holder, means pivotally mounting said cup holder on said lug, and attachment means securing said strap to said ledge.

2. A dispenser according to claim 1 which further comprises glare-reducing material over the top of said top-portion.

3. The combination of claim 1 in which said top portion has a top and first front and rear ends and said bottom portion has a bottom and second front and rear ends, said strap comprising a top strap portion extending over said top portion and down said first front and rear ends, and a bottom strap portion extending under said bottom and up said second front and rear ends, said top and bottom strap portions being secured together.

4. A dispenser according to claim 1 in which said attachment means comprises a pair of Velcro-like pieces, one said piece being fixed to the underside of said bottom portion and the other said piece being secured to said ledge.

* * * * *